United States Patent
Wu

(10) Patent No.: US 10,530,559 B2
(45) Date of Patent: Jan. 7, 2020

(54) ETHERNET TRANSCEIVER WITH PHY-LEVEL SIGNAL-LOSS DETECTOR

(71) Applicant: Marvell World Trade Ltd., St. Michael (BB)

(72) Inventor: Xing Wu, Palo Alto, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 16/136,329

(22) Filed: Sep. 20, 2018

(65) Prior Publication Data

US 2019/0165921 A1    May 30, 2019

Related U.S. Application Data

(60) Provisional application No. 62/591,602, filed on Nov. 28, 2017, provisional application No. 62/717,601, filed on Aug. 10, 2018.

(51) Int. Cl.
| | |
|---|---|
| *H04L 5/14* | (2006.01) |
| *H04B 3/23* | (2006.01) |
| *H04L 12/26* | (2006.01) |
| *H04L 12/24* | (2006.01) |
| *H04B 3/493* | (2015.01) |

(52) U.S. Cl.
CPC .......... *H04L 5/1461* (2013.01); *H04B 3/235* (2013.01); *H04B 3/493* (2015.01); *H04L 41/16* (2013.01); *H04L 43/0829* (2013.01)

(58) Field of Classification Search
CPC ... H04L 5/1461; H04L 41/16; H04L 43/0829; H04B 3/493; H04B 3/235
See application file for complete search history.

(56) References Cited

U.S. PATENT DOCUMENTS

| | | | | |
|---|---|---|---|---|
| 5,400,361 | A * | 3/1995 | Brauns | H04L 1/246 375/224 |
| 9,130,695 | B1 | 9/2015 | Dalmia | |
| 2014/0043957 | A1* | 2/2014 | Venkatraman | H04L 41/0672 370/216 |
| 2014/0149629 | A1* | 5/2014 | Cranford, Jr. | G06F 13/423 710/313 |
| 2016/0127245 | A1 | 5/2016 | Feyh | |
| 2018/0183629 | A1* | 6/2018 | Pandey | H04B 1/3822 |

OTHER PUBLICATIONS

International Application # PCT/IB2018/057440 Search Report dated Dec. 3, 2018.
802.3bwTM-2015., "IEEE 20 Standard for Ethernet—Amendment 1: Physical Layer Specifications and Management Parameters for 100 Mb/s Operation over a Single Balanced Twisted Pair Cable (100BASE-T1)", 88 pages, Oct. 26, 2015.

* cited by examiner

*Primary Examiner* — Jae Y Lee

(57) ABSTRACT

An Ethernet transceiver includes physical-layer (PHY) circuitry and a signal-loss detector. The PHY circuitry is configured to receive a signal from a peer transceiver, to process the received signal in a series of digital PHY-level processing operations, and to output the processed signal for Medium Access Control (MAC) processing. The signal-loss detector is configured to receive, from the PHY circuitry, a digital version of the received signal, and to detect a signal-loss event based on an amplitude of the digital version of the received signal.

14 Claims, 5 Drawing Sheets

ETHERNET TRANSCEIVER WITH PHY-LEVEL SIGNAL-LOSS DETECTOR

CROSS-REFERENCE TO RELATED APPLICATIONS

This application claims the benefit of U.S. Provisional Patent Application 62/591,602, filed Nov. 28, 2017, and U.S. Provisional Patent Application 62/717,601, filed Aug. 10, 2018, whose disclosures are incorporated herein by reference.

FIELD OF THE DISCLOSURE

The present disclosure relates generally to data communication, and particularly to methods and systems for signal-loss detection in Ethernet transceivers.

BACKGROUND

High-speed communication over wire media is used in various fields such as Ethernet for automotive and industrial applications. Vendors and standardization bodies are therefore working to develop suitable communication solutions and standards.

The IEEE 802.3 (Ethernet) is a working group that develops a collection of standards defining the Physical Layer (PHY) and data link layer's Media Access Control (MAC) of wired Ethernet.

For example, a standard for 100 Mb/s Ethernet over a single twisted pair, also known as 100BASE-T1, is specified in IEEE standard 802.3bw™-2015, entitled "IEEE Standard for Ethernet—Amendment 1: Physical Layer Specifications and Management Parameters for 100 Mb/s Operation over a Single Balanced Twisted Pair Cable (100BASE-T1)," Mar. 6, 2016. The 100BASE-T1 standard defines the Physical Layer (PHY) specifications and management parameters for point-to-point full duplex 100 Mb/s Ethernet operation over single balanced twisted-pair cabling. In the description that follows, the terms "100BASE-T1 standard" and "IEEE 802.3 standard" are used interchangeably.

The description above is presented as a general overview of related art in this field and should not be construed as an admission that any of the information it contains constitutes prior art against the present patent application.

SUMMARY

An embodiment that is described herein provides an Ethernet transceiver including physical-layer (PHY) circuitry and a signal-loss detector. The PHY circuitry is configured to receive a signal from a peer transceiver, to process the received signal in a series of digital PHY-level processing operations, and to output the processed signal for Medium Access Control (MAC) processing. The signal-loss detector is configured to receive, from the PHY circuitry, a digital version of the received signal, and to detect a signal-loss event based on an amplitude of the digital version of the received signal.

In some embodiments, the signal-loss detector is configured to receive from the PHY circuitry a digital version of the received signal that underwent only an initial subset of the PHY-level processing operations. In an embodiment, in absence of signal-loss, the received signal is known to include no more than a predefined number of consecutive zeros, and the signal-loss detector is configured to detect the signal-loss event by identifying that the digital version of the received signal includes a sequence of more than the predefined number of consecutive zeros.

In a disclosed embodiment, the signal-loss detector is configured to detect the signal-loss event before an error event, caused by the signal-loss event, is identified in the MAC processing. In another embodiment, the signal-loss detector is configured to calculate an average amplitude of the digital version of the received signal, and to detect the signal-loss event by identifying that the average amplitude is below a predefined amplitude threshold.

In yet another embodiment, the PHY circuitry includes an echo canceller configured to cancel echo signals in the received signal, followed by an equalizer configured to filter the received signal, and the signal-loss detector is configured to receive the digital version of the received signal after the echo canceller but before the equalizer. In an example embodiment, in response to detecting the signal-loss event, the signal-loss detector is configured to initiate a reset operation to reset the transceiver.

In some embodiments, the PHY circuitry is configured to process the received signal in accordance with a PHY-control state-machine having multiple states indicative of a current state of a link between the transceiver and the peer transceiver, and the signal-loss detector is configured to output a notification of the signal-loss event only in a predefined partial subset of the states. In some embodiments, the signal-loss detector is configured to detect the signal-loss event only after the received signal is initially detected by the PHY circuitry.

There is additionally provided, in accordance with an embodiment that is described herein, a method for signal-loss detection in an Ethernet transceiver. The method includes, using physical-layer (PHY) circuitry, receiving a signal from a peer transceiver, processing the received signal in a series of digital PHY-level processing operations, and outputting the processed signal for Medium Access Control (MAC) processing. A digital version of the received signal is received from the PHY circuitry, and a signal-loss event is detected based on an amplitude of the digital version of the received signal.

There is also provided, in accordance with an embodiment that is described herein, an Ethernet transceiver including physical-layer (PHY) circuitry and a signal-loss detector. The PHY circuitry is configured to receive a signal from a peer transceiver, to process the received signal, and to output the processed signal for Medium Access Control (MAC) processing. The signal-loss detector is configured to detect a signal-loss event by analyzing a PHY-level version of the received signal that is processed by the PHY circuitry.

There is further provided, in accordance with an embodiment that is described herein, an method for signal-loss detection in an Ethernet transceiver. The method includes, using physical-layer (PHY) circuitry, receiving a signal from a peer transceiver, processing the received signal, and outputting the processed signal for Medium Access Control (MAC) processing. A signal-loss event is detected by analyzing a PHY-level version of the received signal that is processed by the PHY circuitry.

The present disclosure will be more fully understood from the following detailed description of the embodiments thereof, taken together with the drawings in which:

DETAILED DESCRIPTION OF EMBODIMENTS

Figure 1:
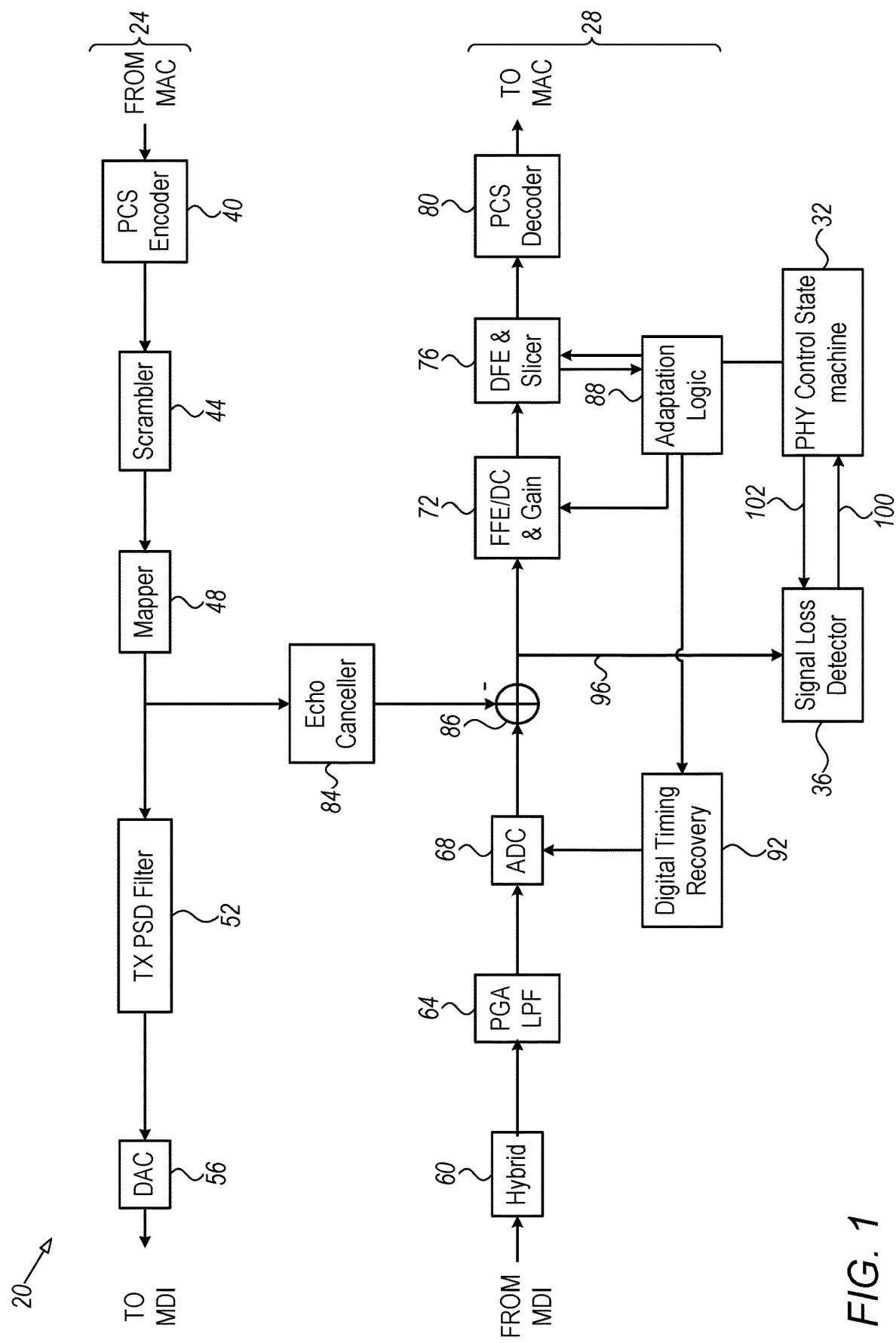
FIG. 1 is a block diagram that schematically illustrates an Ethernet transceiver employing PHY-level signal-loss detection, in accordance with an embodiment that is described herein.

Communication between peer Ethernet transceivers, also referred to as Link Partners (LPs) might be disrupted for various reasons. Upon detecting that communication is lost, the two LPs initiate a "link-up" process for restoring the link and resuming communication. In some use-cases and applications, for example automotive networks and various industrial applications, it is imperative that both the detection of communication loss and the link-up process be extremely fast.

Embodiments that are described herein provide improved Ethernet transceivers that detect signal loss with very small latency, and associated methods.

In some embodiments, an Ethernet transceiver comprises physical-layer (PHY) circuitry, which is configured to receive a signal from a peer transceiver via a Medium-Dependent Interface (MDI), to process the received signal, and to output the processed signal for subsequent Medium Access Control (MAC) processing, such as medium resource allocation, framing and addressing. The PHY circuitry applies to the signal a series of PHY-level processing operations, such as echo cancellation, equalization and decoding.

In some embodiments, the Ethernet transceiver further comprises a signal-loss detector that operates in its physical layer. In an embodiment, the signal-loss detector is configured to receive from the PHY circuitry a digital version of the received signal that underwent an initial subset of the PHY-level processing operations that is less than all of the PHY-level processing operations. In an example embodiment, the signal-loss detector receives the signal after echo cancellation but before equalization. Detecting signal loss after signal cancellation is sometimes preferable, in order to reduce the probability of the receiver mistaking its own echo for the signal. Nevertheless, in some cases, e.g., when transmitter echo is weak, the signal may be provided to the signal-loss detector before echo cancellation.

The signal-loss detector detects that signal loss has occurred, based on an amplitude of the digital version of the received signal provided thereto. Upon detecting signal loss, the signal-loss detector typically initiates a reset of the Ethernet transceiver. The reset typically re-initializes the transceiver, including the PHY-control state machine (described below).

Since the disclosed signal-loss detectors operate at the physical layer, in hardware, signal-loss detection is practically immediate. For example, the disclosed signal-loss detectors detect signal loss long before the upper layers, e.g., the MAC layer, experience any errors or noticeable effects. When using the disclosed techniques, the link-up process is faster and better coordinated between the Link Partners, relative to a solution that relies on detection by higher layers.

Example implementations of signal-loss detectors are described herein. The embodiments described herein focus mainly on signal-loss detectors that operate on a digital version of the received signal, but analog implementations are also contemplated. Interaction between the signal-loss detector and a PHY-control state machine of the Ethernet transceiver is also addressed.

FIG. 1 is a block diagram that schematically illustrates an Ethernet transceiver 20 employing PHY-level signal-loss detection, in accordance with an embodiment that is described herein. In the present example, transceiver 20 is compliant with the 100BASE-T1 specification, cited above. Alternatively, however, other Ethernet specifications can be supported in a similar manner.

Transceiver 20 comprises a transmitter 24 and a receiver 28, which perform the PHY-level transmission and reception operations, respectively. Transmitter 24 and receiver 28 are thus collectively referred to collectively as "PHY circuitry."

Typically, transceiver 20 is connected to the applicable communication medium (e.g., twisted-pair copper wire) via a Medium-Independent Interface (MDI—left-hand side of the figure, not shown). Transceiver 20 communicates with a peer Ethernet transceiver via the MDI. Transceiver 20 also communicates locally with a suitable MAC processor (right-hand side of the figure, not shown). In an example embodiment, transceiver 20 communicates with the MAC processor in accordance with a Medium-Independent Interface (MII) protocol.

In the embodiment of FIG. 1, transmitter 24 comprises a Physical Coding Sublayer (PCS) encoder 40, followed by a scrambler 44, a mapper 48, a transmit filter 52, and a Digital-to-Analog Converter (DAC) 56. PCS encoder 40 receives data for transmission from the MAC layer and encodes the data with 4B3B encoding that increases the data rate from 25 MHz to 33.33 MHz. Scrambler 44 scrambles the encoded data using a pseudorandom scrambling sequence. Mapper 48 modulates the scrambled data with a 3B2T modulation scheme (which modulates every three bits onto two ternary symbols), thereby increasing the data rate from 33.33 MHz to 66.66 MHz. Transmit filter 52 typically comprises a partial-response filter. DAC 56 outputs a base-band analog signal, which is sent via the MDI over the twisted-pair medium to the peer transceiver.

In the example of FIG. 1, receiver 28 comprises a hybrid module 60, a Programmable-Gain Amplifier and Low-Pass filter (PGA & LPF) 64, an Analog-to-Digital Converter (ADC) 68, a Feed-Forward Equalizer (FFE) 72, a Decision Feedback Equalizer (DFE) and slicer 76, and a PCS decoder 80. Hybrid 60 receives a signal from the peer Ethernet transceiver via the MDI. ADC 68 digitizes the received signal after the signal has been amplified and filtered by PGA & LPF 64. FFE 72 equalizes the digital signal and also performs Direct-Current (DC) and gain correction. DFE & slicer 76 perform additional decision-directed equalization, and also makes bit decisions. Decoder 80 decodes the 4B3B PCS coding. The decoded data at the output of decoder 80 is provided to the MAC layer.

In an embodiment, transceiver 20 further comprises an echo canceller 84, which cancels replicas ("echoes") of the transmitted signal that are superimposed on the received signal. Typically, Echo canceller 84 generates a replica of the transmitted signal that is matched in gain and phase to the received signal. A subtractor 86 subtracts the output of echo canceller 84 from the received signal, so as to cancel the echo.

In some embodiments, transceiver 20 comprises adaptation logic 88, which is configured to adapt the operation of one or more of the PHY processing operations. In the present example, adaptation logic 88 controls a digital timing recovery circuit 92, which in turn controls the sampling clock signal of ADC 68. Adaptation logic 88 also controls the coefficients (taps) of FFE 72, thereby adapting the DC level, gain and transfer function of the receiver. Adaptation logic 88 further controls the coefficients (taps) of DFE 76 in a decision-directed manner, i.e., based on the slicer decisions. This adaptation further controls the receiver transfer function.

Figure 3:
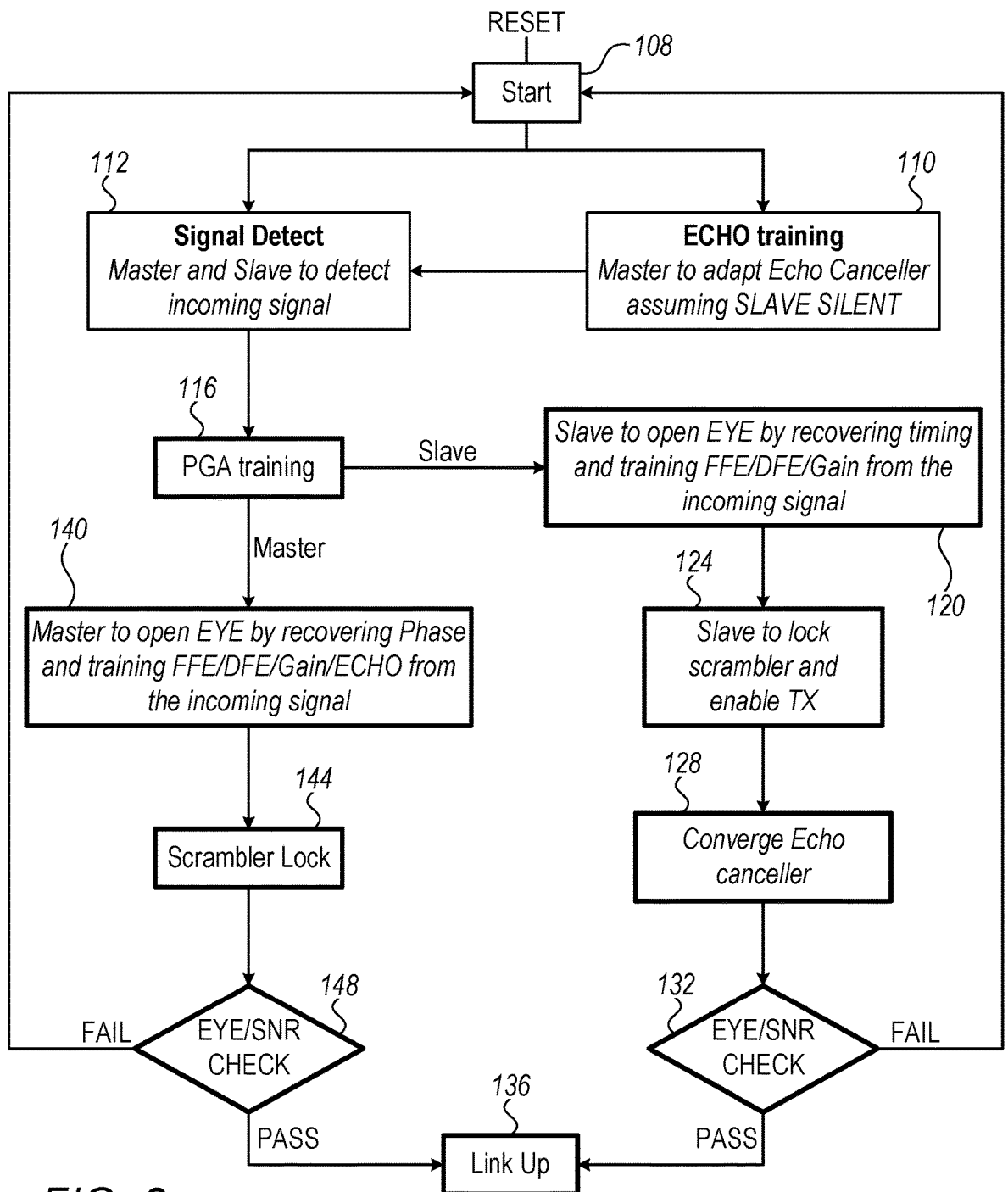
FIG. 3 is a flow chart that schematically illustrates operation of an Ethernet transceiver in accordance with a PHY-control state machine, in accordance with an embodiment that is described herein.

In the embodiment of FIG. 1, the operation of transceiver 20 is controlled by a PHY-control state machine 32. Among other tasks, state machine 32 is responsible for managing the PHY portions of "link-up" processes in which transceiver 20 and the peer transceiver establish communication with one another. An example of PHY-control state machine 32 is shown in FIG. 3 below.

In the present context, echo canceler 84, adaptation logic 88, timing recovery circuit 92 and state machine 32 are also considered part of the PHY circuitry, along with transmitter 24 and receiver 28. The example partitioning of the PHY circuitry into blocks shown in FIG. 1, and the "division of labor" among the various blocks, are depicted solely for the sake of conceptual clarity. In alternative embodiments, any other suitable partitioning can be used.

In some embodiments, transceiver 20 further comprises a signal-loss detector 36, which is configured to receive a digital version of the signal processed by receiver 28, and to use this signal for detecting signal-loss events at the physical layer. In the present context, the term "signal-loss event" refers to any scenario in which the signal of the peer Ethernet transceiver ceases to be received correctly in transceiver 20. Signal-loss events may be occur for various reasons, such as a reset or fault of the peer transceiver, a network fault or other fault related to the communication medium, excessive noise or Electromagnetic Interference (EMI), or a fault occurring in transceiver 20 itself.

In the present example, the digital version of the received signal, provided to signal-loss detector 36, is an echo-canceled signal 96 taken from the output of subtractor 86. Signal 96 is thus provided after echo cancellation but before equalization. In alternative embodiments, however, the digital version of the received signal may be taken from any other suitable point in the PHY circuitry.

Upon detecting a signal-loss event, signal-loss detector 36 asserts a "detector output" signal 100 that is provided to state machine 32. In an embodiment, in response to this signal, state machine 32 performs a reset of transceiver 20. Since signal-loss detection in the physical later means the reset occurs practically immediately in response to the signal loss, the subsequent link-up process is fast and highly coordinated between transceiver 20 and the peer transceiver. Additionally or alternatively, signal-loss detector 36 may initiate any other suitable action in response to detecting a signal-loss event.

In an embodiment, signal-loss detector 36 is active only in a partial subset of the states of state machine 32. For this purpose, state machine 32 provides detector 36 with a "state information" signal 102, which is indicative of the current state of the state machine. This feature is explained in greater detail with reference to FIG. 3 below.

Figure 2:
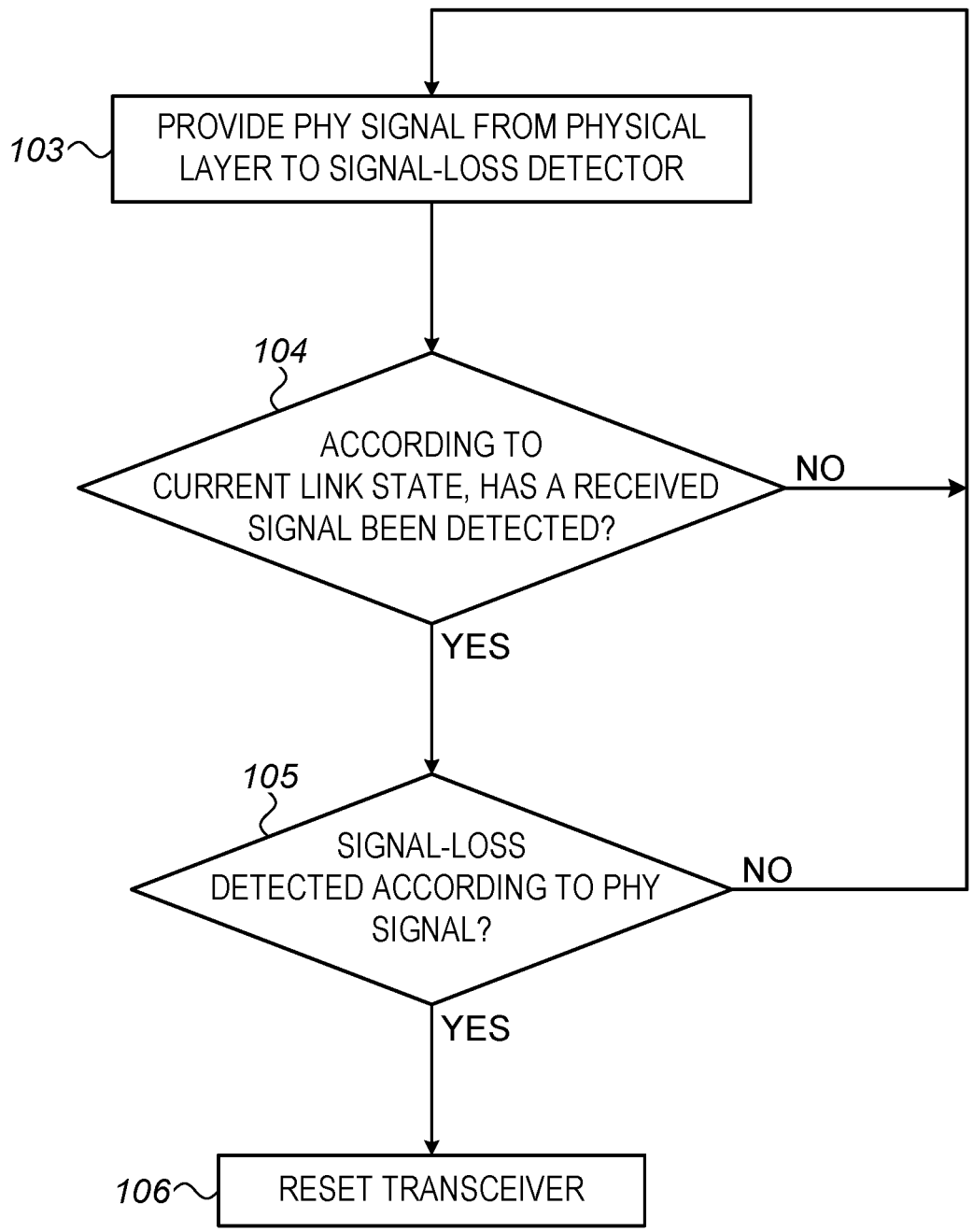
FIG. 2 is a flow chart that schematically illustrates a method for PHY-level signal-loss detection, in accordance with an embodiment that is described herein.

FIG. 2 is a flow chart that schematically illustrates a method for PHY-level signal-loss detection, in accordance with an embodiment that is described herein. The method begins at a signal provisioning operation 103, in which the PHY circuitry of Ethernet transceiver 20 provides a suitable signal to signal-loss detector 36.

At a state checking operation 104, signal-loss detector 36 checks whether, according to PHY-control state machine 32, the signal from the peer transceiver has been detected. If not, the method loops back to operation 103. If the peer transceiver's signal has been detected, signal-loss detector 36 checks whether a signal-loss event has occurred, at a signal-loss checking operation 105. If so, signal-loss detector 36 resets transceiver 20. Otherwise, the method loops back to operation 103.

FIG. 3 is a flow chart that schematically illustrates the operation of transceiver 20 in accordance with PHY-control state machine 32, in accordance with an embodiment that is described herein. Each step in the flow chart roughly corresponds to a respective operational state in state machine 32.

As seen in the figure, the state machine (and therefore the flow chart) specifies the states of the entire link, i.e., the joint states of the two Link Partners (LPs)—transceiver 20 and the peer transceiver. One of the link partners is defined as a master, which controls the clock timing of the link. The other link partner is defined as a slave, which adapts to the clock timing set by the master. Transceiver 20 may be configured to serve as a master or as a slave, as appropriate. The disclosed signal-loss detection scheme is used in both cases.

Since the state machine represents the joint states of the two LPs, it is typically expected that the master and the slave be coordinated with regard to the current state. In other words, at any given time, transceiver 20 operates under a certain assumption as to the state of the peer transceiver. If coordination is lost, the link-up process may be slow or fail altogether. The disclosed high-speed signal-loss detection scheme helps maintain coordination between transceiver 20 and the peer transceiver, and therefore speeds-up the link-up process considerably. A typical requirement in an automotive system, for example, is that the link-up process be completed within 100 mS or less. The disclosed solution enables transceiver 20 and the peer transceiver to meet this requirement.

Blocks marked with a bold frame in FIG. 3 correspond to states of state machine 32 in which signal-loss detector 36 is active. Detector 36 is inactive in the other states. In the present context, the term "inactive" also refers to implementations in which detector 36 does identify signal-loss events, but the detections are ignored or otherwise not acted upon.

In the example of FIG. 3, signal-loss detector 36 is inactive during the initial states of the link-up process, before the received signal is initially detected by the PHY circuitry. Signal-loss detector 36 becomes active during the later states of the link-up process, after initial detection of the received signal by the PHY circuitry. In alternative embodiments, however, signal-loss detector 36 may be activated and deactivated in any other suitable subsets of states.

In the present example, the link-up process begins at a start operation 104, following a reset of both LPs. At this stage, the slave is silent, i.e., does not transmit, and the master begins to transmit a training signal. At an echo canceller training operation 108, the master trains its echo canceller 84 under the assumption that the slave is silent.

At a signal detection operation 112, the master and slave perform signal detection. Signal detection begins at the slave, since initially only the master is transmitting. Once the slave detects the signal of the master, the slave begins to transmit, as well, and then the master detects the signal of the slave.

In the present example, signal-loss detector 36 is inactive in both the master and the slave, until signal detection is complete in both the master and the slave (i.e., through operations 104, 108 and 112). In the subsequent operations, signal-loss detector 36 is active. In an embodiment, the activation and deactivation of signal-loss detector 36 is performed by state machine 32, which asserts and de-asserts the "state information" signal 102 provided to signal-loss detector 36 (see bottom of FIG. 1).

Once signal detection is completed in both the master and the slave, the master and slave proceed to adjust their respective Programmable-Gain Amplifiers (PGAs) 64, at a PGA training operation 116. PGA setting aims, for example, to set the appropriate signal level for digitizing the received signal by ADC 68. From this point the process splits into two parallel sub-processes, one performed in the slave and the other performed in the master.

In the slave, at a slave eye opening operation 120, adaptation logic 88 adapts the various receiver loops (e.g., timing recovery and adaptive equalizers) to increase the received signal quality. In the present embodiment, adaptation logic 88 uses the signal received from the master for (i) recovering the link timing using timing recovery circuit 92, and (ii) adapting FFE 72 (including DC gain setting) and DFE 76. This process is referred to as "eye opening" because it typically starts with a closed eye diagram due to non-optimal timing and equalizer settings, and ends with an open eye diagram following adaptation.

Then, at a slave scrambler locking operation 124, the slave locks its scrambler 44, and also enables transmission. Then, at a slave echo canceller locking operation 128, the slave adapts its echo canceller 84.

At a slave-side quality checking operation 132, the slave checks whether the master's signal is received with sufficient quality. Any suitable criterion can be used for this purpose, e.g., checking whether the receiver eye diagram is open beyond a certain threshold, or checking whether the Signal-to-Noise ratio (SNR) of the received signal is above a certain threshold.

If the master's signal is received with sufficient quality, the slave proceeds to a link-up operation 136, in which the slave-side link-up process terminates. Otherwise, the slave transitions back to start operation 104.

In the master, following PGA Training operation 116, the master transitions to a master eye opening operation 140. In this operation, adaptation logic 88 of the master uses the signal received from the slave for (i) recovering the signal phase, (ii) adapting FFE 72 (including DC gain setting) and DFE 76, and (iii) adapting echo canceller 84. Then at a master scrambler locking operation 144, the master locks its scrambler 44.

At a master-side quality checking operation 148, the master checks whether the slave's signal is received with sufficient quality. As with the slave, any suitable criterion can be used, e.g., checking whether the receiver eye diagram is open beyond a certain threshold, or checking whether the SNR of the received signal is above a certain threshold.

If the slave's signal is received with sufficient quality, the master proceeds to link-up operation 136, and the master-side link-up process terminates. Otherwise, the master transitions back to start operation 104.

The flow chart of FIG. 3 is depicted solely by way of example. Any other suitable flow, and corresponding state machine, can be used in alternative embodiments.

As noted above, in the present example signal-loss detector 36 is active throughout operations 116-136, both in the master and in the slave. If signal loss is detected while in any of these operations, signal-loss detector 36 initiates a reset of transceiver 20. As a result, transceiver 20 will transition to start operation 104 practically immediately. Since both link partners will immediately transition to operation 104 when the peer signal is lost, the link-up process will be well coordinated between them, leading to fast recovery.

Figure 4:
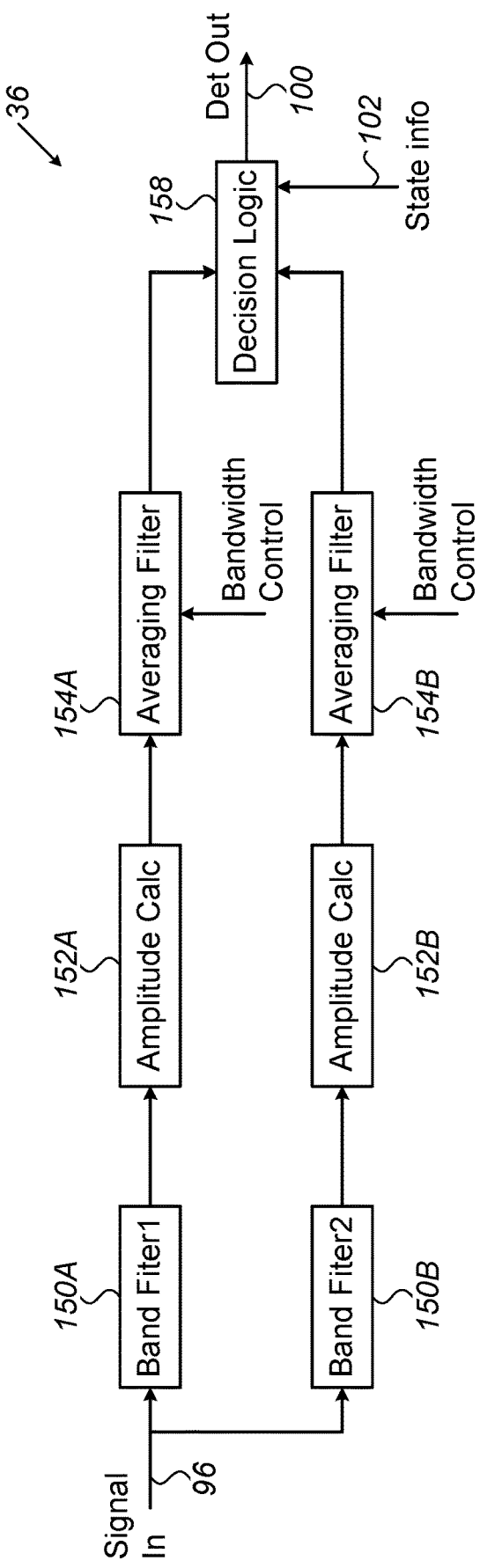
FIG. 4 is a block diagram that schematically illustrates a PHY-level signal-loss detector used in the transceiver of FIG. 1, in accordance with an embodiment that is described herein.
Figure 5:
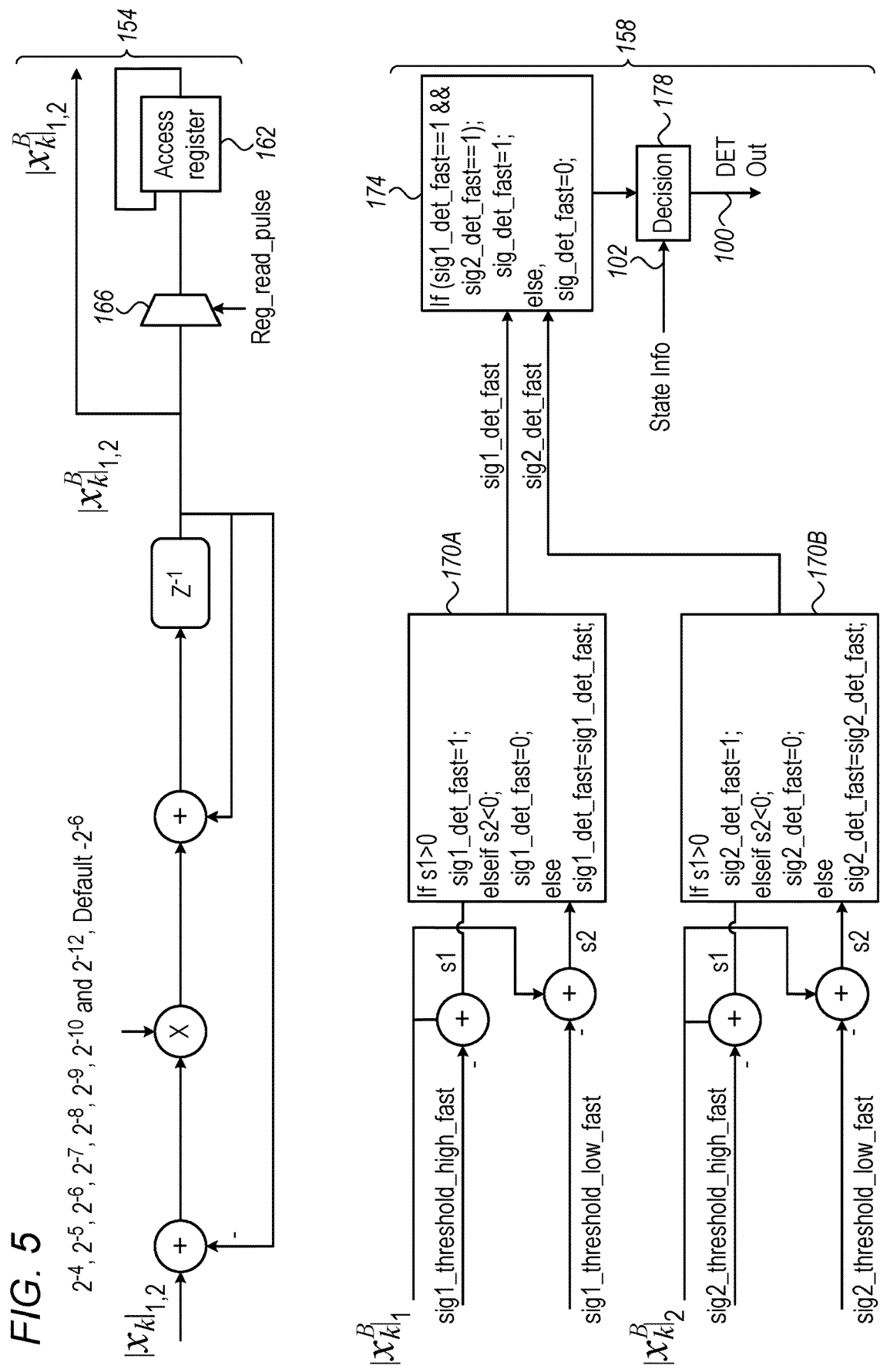
FIG. 5 is a block diagram that schematically illustrates an example implementation of the PHY-level signal-loss detector of FIG. 4, in accordance with an embodiment that is described herein.

FIG. 4 is a block diagram that schematically illustrates the internal structure of PHY-level signal-loss detector 36 used in the transceiver of FIG. 1, in accordance with an embodiment that is described herein. In the present example, signal-loss detector 36 comprises two processing chains that process two respective frequency sub-bands of signal 96. The first processing chain comprises a band filter 150A that passes a first frequency sub-band, followed by an amplitude calculation circuit 152A, followed by an averaging filter 154A. The second processing chain comprises a band filter 150B that passes a second frequency sub-band, followed by an amplitude calculation circuit 152B, followed by an averaging filter 154B. The outputs of averaging filters 154A and 154B are provided to a decision logic 158. Example implementations of filters 154A and 154B and of decision logic 158 are shown in FIG. 5 below.

In the present embodiment, the input signal to band filters 150A and 150B is digital signal 96 (see FIG. 1), taken from receiver 28 after echo cancellation but before equalization. The input signal comprises a sequence of digital samples, each represented by n bits, e.g., twelve bits. Each sample is signed, i.e., can be positive or negative. After filtering, each of amplitude calculation circuits 150A and 150B calculates and outputs the amplitude, i.e., the absolute value, of each sample of the filtered digital input signal.

In the present embodiment, each of averaging filters 154A and 154B calculates an average of the signal amplitude over a configurable moving time window (or equivalently, over a configurable bandwidth). The averaged signal amplitudes are provided as input to decision logic 158. Decision logic 158 decides, based on the averaged signal amplitudes, whether a signal-loss event has occurred or not. In an embodiment, decision logic 158 compares the averaged signal amplitude to a predefined threshold. If the averaged signal amplitude is below the threshold, decision logic 158 decides that signal loss has occurred. In response, decision logic 158 asserts "detector output" signal 100.

In an embodiment, decision logic 158 receives "state information" signal 102 from state machine 32. As explained above with respect to FIG. 3, if signal 102 indicates that the current state corresponds to a stage of the link-up process that is between operations 104-112 of FIG. 3, decision logic 158 does not assert the "detector output" signal 100 even if signal loss is detected. Otherwise (if signal 102 indicates that the current state corresponds to a stage of the link-up process that is between operations 116-136 of FIG. 3), decision logic 158 asserts signal 100 normally when detecting signal loss.

In some embodiments, decision logic 158 is configured to declare a signal-loss event (e.g., assert "detector output" signal 100) in response to estimating that the received signal comprises a sequence of more than a predefined number of consecutive zeros. The predefined number of consecutive zeros is typically derived from the configuration of scrambler 44 in the peer transceiver. In an example embodiment, scrambler 44 of the peer transceiver has a scrambling scheme that cannot output more than a predefined number of consecutive zeros (e.g., no more than nine zeros). Decision logic 158 is thus configured, in an embodiment, to declare a signal-loss event upon identifying that the received signal comprises a longer sequence of consecutive zeros (e.g., more than nine consecutive zeros).

This setting, which is based on the knowledge of the scrambling scheme used by the peer transceiver, avoids false detection due to data patterns that legitimately have small average signal amplitudes. As such, this setting ensures high reliability, and at the same time high detection speed. Note that, as seen in FIG. 3 above, the peer transceiver does not begin transmission before its scrambler is locked.

FIG. 5 is a block diagram that schematically illustrates an example implementation of averaging filters 154 (each of filters 154A and 154B) and decision logic 158 of FIG. 4, in accordance with an embodiment that is described herein. Additional details are given in U.S. Provisional Patent Application 62/591,602, cited above and incorporated herein by reference in its entirety.

In the present example, averaging filters 154A and 154B (jointly denoted 154 at the top of the figure) receive the amplitudes of the input signal samples ($|x_k|_{1,2}$) from amplitude calculation circuit 150 (FIG. 4). In the notation used, $|x_k|_1$ refers to the amplitude calculated by amplitude calculator 152A (FIG. 4), and $|x_k|_2$ refers to the amplitude calculated by amplitude calculator 152B.

Averaging filters 154A and 154B are each implemented using a delay stage (denoted $Z^{-1}$) with two feedback connections. The filter bandwidth is configurable, in the present example selectable from the set of values $\{2^{-4}, 2^{-5}, 2^{-6}, 2^{-7}, 2^{-8}, 2^{-9}, 2^{-10}, 2^{-12}\}$, the default setting being $2^{-6}$. The averaged signal amplitudes at the filter outputs are denoted $|x_k^B|_{1,2}$. ($|x_k^B|_1$ denotes the output of filter 154A, and $|x_k^B|_2$ denotes the output of filter 154B.)

In an embodiment, but not necessarily, each of filters 154A and 154B further comprises an access register 162, which is configured to store one or more values of $|x_k^B|_{1,2}$, for debugging purposes. A multiplexer 166 controls which values of $|x_k^B|_{1,2}$ will be stored in register 162.

In the present example, decision logic 158, shown at the bottom of the figure, comprises two branches. The first branch receives the averaged signal amplitudes $|x_k^B|_1$ from averaging filter 154A. The second branch receives the averaged signal amplitudes $|x_k^B|_2$ from averaging filter 154B.

The first branch of decision logic 158 comprises a comparison block 170A, which compares the averaged signal amplitudes $|x_k^B|_1$ to two thresholds denoted sig1_threshold_high_fast and sig1_threshold_low_fast. Similarly, the second branch of decision logic 158 comprises a comparison block 170B, which compares the averaged signal amplitudes $|x_k^B|_2$ to two thresholds denoted sig2_threshold_high_fast and sig2_threshold_low_fast.

The outputs of blocks 170A and 170B are denoted sig1_det_fast and sig2_det_fast, respectively. An additional comparison block 174 combines the two detections. In the present example, block 174 outputs an indication that signal-loss is detected when both sig1_det_fast and sig2_det_fast indicate signal-loss. A decision block 178 selectively masks the output of block 174 depending on the "state information" signal 102 from state machine 32, so as to produce the "detector output" signal 100.

The implementation of signal-loss detector 36 and its components, as shown in FIGS. 4 and 5, is an example implementation that is depicted solely for the sake of conceptual clarity. In alternative embodiments, any other suitable implementation can be used.

The different elements of Ethernet transceiver 20, e.g. signal-loss detector 36 and its components, shown in FIGS. 1, 4 and 5, are typically implemented using dedicated hardware or firmware, such as using hard-wired or programmable logic, e.g., in an Application-Specific Integrated Circuit (ASIC) or Field-Programmable Gate Array (FPGA). In some embodiments, however, certain transceiver elements, for example elements of signal-loss detector 36 and/or state machine 32, are implemented in one or more programmable processors, which are programmed in software or firmware to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address Ethernet transceivers used in automotive applications, the methods and systems described herein can also be used in other applications, e.g., industrial applications and other applications that are intolerant to service outages and high latency.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet transceiver, comprising:
   physical-layer (PHY) circuitry, configured to receive a signal from a peer transceiver, to process the received signal in a series of digital PHY-level processing operations, the PHY-level operations comprising at least cancellation of echo signals in the received signal followed by equalization of the received signal, the PHY circuitry further configured to output the processed signal for Medium Access Control (MAC) processing; and
   a signal-loss detector, configured to receive, from the PHY circuitry, a digital version of the received signal, wherein the echo signals in the digital version have been canceled but the digital version is not equalized, and to detect a signal-loss event based on an amplitude of the digital version of the received signal.

2. The transceiver according to claim 1, wherein the signal-loss detector is configured to receive from the PHY circuitry a digital version of the received signal that underwent only an initial subset of the PHY-level processing operations.

3. The transceiver according to claim 1, wherein the signal-loss detector is configured to detect the signal-loss event before an error event, caused by the signal-loss event, is identified in the MAC processing.

4. The transceiver according to claim 1, wherein the signal-loss detector is configured to calculate an average amplitude of the digital version of the received signal, and to detect the signal-loss event by identifying that the average amplitude is below a predefined amplitude threshold.

5. The transceiver according to claim 1, wherein, in response to detecting the signal-loss event, the signal-loss detector is configured to initiate a reset operation to reset the transceiver.

6. The transceiver according to claim 1, wherein the PHY circuitry is configured to process the received signal in accordance with a PHY-control state-machine having multiple states indicative of a current state of a link between the transceiver and the peer transceiver, and wherein the signal-loss detector is configured to output a notification of the signal-loss event only in a predefined partial subset of the states.

7. The transceiver according to claim 1, wherein the signal-loss detector is configured to detect the signal-loss event only after the received signal is initially detected by the PHY circuitry.

8. A method for signal-loss detection in an Ethernet transceiver, the method comprising:
using physical-layer (PHY) circuitry:
receiving a signal from a peer transceiver;
processing the received signal in a series of digital PHY-level processing operations, the PHY-level operations comprising at least cancellation of echo signals in the received signal followed by equalization of the received signal; and
outputting the processed signal for Medium Access Control (MAC) processing; and
receiving, from the PHY circuitry, a digital version of the received signal, wherein the echo signals in the digital version have been canceled but the digital version is not equalized, and detecting a signal-loss event based on an amplitude of the digital version of the received signal.

9. The method according to claim 8, wherein receiving the digital version comprises receiving from the PHY circuitry a digital version of the received signal that underwent only an initial subset of the PHY-level processing operations.

10. The method according to claim 8, wherein the detecting the signal-loss event is performed before an error event, caused by the signal-loss event, is identified in the MAC processing.

11. The method according to claim 8, wherein detecting the signal-loss event comprises calculating an average amplitude of the digital version of the received signal, and identifying that the average amplitude is below a predefined amplitude threshold.

12. The method according to claim 8, further comprising, in response to detecting the signal-loss event, initiating a reset operation to reset the transceiver.

13. The method according to claim 8, wherein processing the received signal comprises applying a PHY-control state-machine having multiple states indicative of a current state of a link between the transceiver and the peer transceiver, and wherein detecting the signal-loss event comprises outputting a notification of the signal-loss event only in a predefined partial subset of the states.

14. The method according to claim 8, wherein detecting the signal-loss event is performed only after the received signal is initially detected by the PHY circuitry.

\* \* \* \* \*